(No Model.)
J. C. JACOBSON.
CURTAIN FOR CARS.
No. 328,224. Patented Oct. 13, 1885.
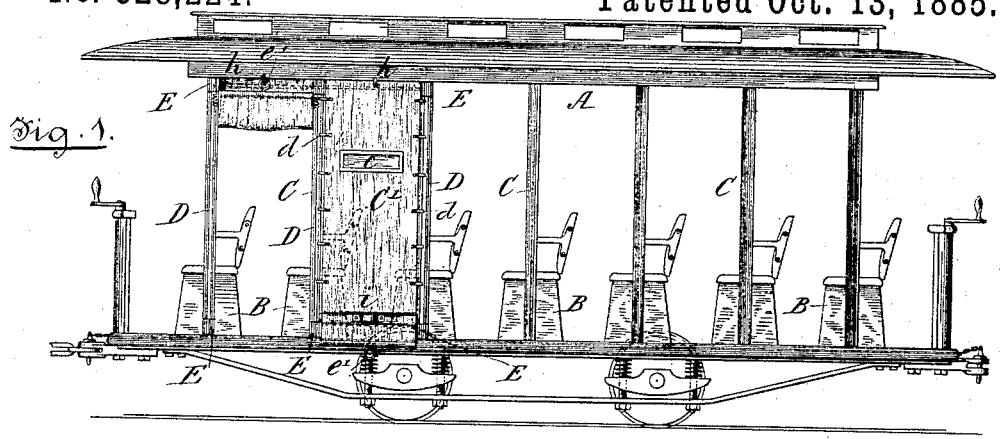
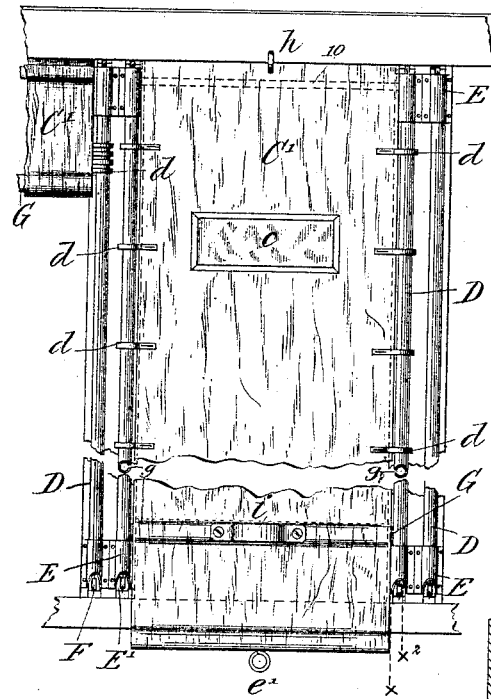
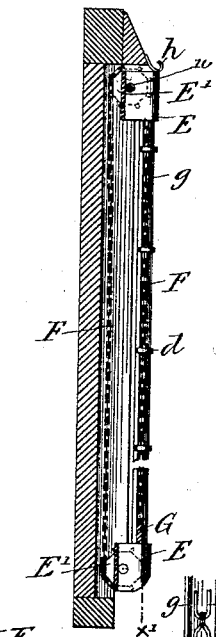
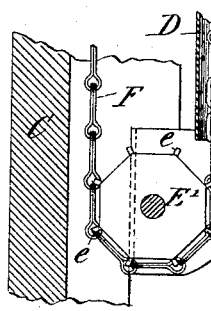
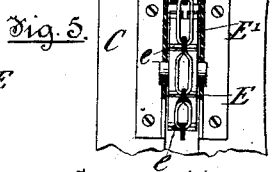
Witnesses:
J. A. Rennie
F. L. Emery
Inventor,
John C. Jacobson
Per: Crosby & Gregory
his Attys.

UNITED STATES PATENT OFFICE.

JOHN C. JACOBSON, OF BOSTON, MASSACHUSETTS.

CURTAIN FOR CARS.

SPECIFICATION forming part of Letters Patent No. 328,224, dated October 13, 1885.

Application filed August 7, 1885. Serial No. 173,865. (No model.)

*To all whom it may concern:*

Be it known that I, JOHN C. JACOBSON, of Boston, county of Suffolk, and State of Massachusetts, have invented an Improvement in Curtains for Cars, &c., of which the following description, in connection with the accompanying drawings, is a specification, like letters on the drawings representing like parts.

My invention has for its object the production of a curtain particularly designed for use upon open street-cars to prevent the entrance of rain.

The invention consists of independent drop-curtains adapted to be raised and lowered by means of endless chains or bands moving within hollow rods or tubes placed at each side of the curtain. These hollow rods or tubes, surrounded with a series of rings connected to the curtains, are held at their upper and lower extremities by suitable stays or supports fastened to the car, and in which are mounted or pivoted suitable sprocket or other shaped wheels, around which the endless chains are passed. To these chains are attached the opposite ends of a rod extended through a pocket in or across the curtain, the rod being so connected with the curtain and with the chains that the movement of the rod vertically causes the chains to be moved in unison with it.

Figure 1 represents in side elevation an ordinary open street-car, it having applied to it two curtains embodying my invention, one being in an elevated position, the other lowered. Fig. 2 is an enlarged view showing one of my improved curtains lowered and part of the next curtain raised. Fig. 3 is a section of Fig. 2 on the dotted line $x$, looking toward the right. Fig. 4 is an enlarged sectional detail of one of the sprocket-wheels and part of the chain, the dotted line $x^2$, Fig. 2, showing the line of section; and Fig. 5 is an enlarged section of Fig. 4, taken on the line $x'$, Fig. 3.

Referring to the drawings, A represents the car; B, the seats, and C the uprights or stays, placed, preferably, at the end of each seat, and upon which stays are placed two hollow rods or tubes, D, which extend from the roof to the sill of the car, their ends entering within the supports E. These supports, made as brackets, are fastened by screws, or in any other convenient manner, to the uprights C, or other fixed part of the car, and have journaled therein sprocket-wheels E', over and around which pass the endless chains F, the latter traveling in the rods or tubes D, as will be described. The pair of wheels E', journaled in the uppermost brackets or supports E, are connected by a rod or shaft, 10, which necessitates the simultaneous rotation of these wheels.

The wheels E are preferably, but not necessarily, provided with projections $e$, against which the links of the chain bear in the operation of raising or lowering the curtain, which avoid any possible chance of the chains slipping or otherwise preventing the effectual working of the same.

The curtains C', which are preferably provided with small windows $c$, are fastened to the upper sides of the car, and are provided at each side with a series of rings which encircle the rods or tubes D.

The curtains are also provided near their lower ends with cross-pieces G, the ends of which are projected beyond the side edges of the curtains, and entering within slots or channels $g$ in the sides of the rods or tubes D are connected to the endless chains F at each side of the curtain, thus insuring the simultaneous action of the chains, and, as a consequence, the even and easy descent or ascent of the curtains when the rod is drawn down or lifted up by any person engaging the handle $i$.

Hooks $h$ are provided at the top of the sides of the car—one for each curtain—to which the eyes $e'$ are hooked when the curtains are raised out of the way, it being only necessary to unhook these eyes to permit of the handles $i$ being engaged and the curtains lowered for immediate use.

Although the curtain is herein shown as applied to an open street-car, it is obvious that the same may be employed for various other purposes without departing from my invention—such, for instance, as applied to a canopy-top carriage.

I claim—

1. The combination, in a car, of the uprights C, tubes D, secured to such uprights and provided with supports E, wheels E' E', endless bands upon said wheels traveling through said tubes, and a curtain, C', connected to said bands and having rings $d$ encircling said tubes, substantially as described.

2. The combination, with the curtain C', of the slotted tubes D, endless bands F, and supporting-wheels therefor, cross-piece G, and rings $d$, traveling on the said tubes and connected with the said curtain, substantially as described.

In testimony whereof I have signed my name to this specification in the presence of two subscribing witnesses.

JOHN C. JACOBSON.

Witnesses:
  F. CUTTER,
  C. CONE.